United States Patent
Jahr

(10) Patent No.: US 10,893,398 B2
(45) Date of Patent: Jan. 12, 2021

(54) SUBSCRIBER SELF-ACTIVATION DEVICE, PROGRAM, AND METHOD

(71) Applicant: Giesecke+Devrient Mobile Security America, Inc., Dulles, VA (US)

(72) Inventor: Christoph Jahr, Ashburn, VA (US)

(73) Assignee: GIESECKE+DEVRIENT MOBILE SECURITY AMERICA, INC., Dulles, VA (US)

(*) Notice: Subject to any disclaimer, the term of this patent is extended or adjusted under 35 U.S.C. 154(b) by 0 days.

(21) Appl. No.: 16/097,958

(22) PCT Filed: Apr. 28, 2017

(86) PCT No.: PCT/US2017/030202
§ 371 (c)(1),
(2) Date: Oct. 31, 2018

(87) PCT Pub. No.: WO2017/192395
PCT Pub. Date: Nov. 9, 2017

(65) Prior Publication Data
US 2019/0149965 A1    May 16, 2019

Related U.S. Application Data

(60) Provisional application No. 62/331,887, filed on May 4, 2016.

(51) Int. Cl.
*H04W 72/04* (2009.01)
*H04W 4/50* (2018.01)
(Continued)

(52) U.S. Cl.
CPC ............. *H04W 4/50* (2018.02); *H04W 4/14* (2013.01); *H04W 4/60* (2018.02); *H04W 8/245* (2013.01); *H04W 60/04* (2013.01)

(58) Field of Classification Search
None
See application file for complete search history.

(56) References Cited

U.S. PATENT DOCUMENTS 7,337,330 B2 * 2/2008 Gatto ................... G07F 17/32
463/1
8,050,199 B2 * 11/2011 Garg ................... H04M 3/5237
370/270

(Continued)

OTHER PUBLICATIONS

Korean Intellectual Property Office, International Search Report and Written Opinion of the International Searching Authority in International Patent Application No. PCT/US2017/030202, dated Sep. 14, 2017.

(Continued)

*Primary Examiner* — Willie J Daniel, Jr.
(74) *Attorney, Agent, or Firm* — Faegre Drinker Biddle & Reath LLP

(57) ABSTRACT

A system for self-activation of a portable device on a wireless network includes a first server that receives a first message from a particular portable device with a unique identifier that indicates the device type of the device that is at least one of a first type or a second type of portable device. A second message comprising data including the device type corresponding to the portable device is sent to a second server. The second server sends an activation message in response to receiving the second message when the device type determined is the first type; and the second server sends the activation message after a delay interval that is longer than a boot-up sequence time when the device type determined is the second type. The activation message prompts the user to activate the device for use on the wireless network.

16 Claims, 2 Drawing Sheets

HIGH LEVEL PROCESS FLOW & ARCHITECTURE

(51) Int. Cl.
*H04W 4/14* (2009.01)
*H04W 60/04* (2009.01)
*H04W 8/24* (2009.01)
*H04W 4/60* (2018.01)

(56) References Cited

U.S. PATENT DOCUMENTS

| | | | |
|---|---|---|---|
| 9,276,934 B2* | 3/2016 | D'Argenio | H04L 63/10 |
| 2012/0157047 A1 | 6/2012 | Chen et al. | |
| 2013/0260833 A1 | 10/2013 | De Atley et al. | |
| 2013/0332718 A1 | 12/2013 | Dicker et al. | |
| 2014/0045474 A1 | 2/2014 | Cheuk et al. | |
| 2014/0057615 A1 | 2/2014 | Berry et al. | |
| 2014/0075567 A1* | 3/2014 | Raleigh | H04W 12/10 726/26 |

OTHER PUBLICATIONS

Korean Intellectual Property Office, International Preliminary Report on Patentability in International Patent Application No. PCT/US2017/030202, dated Nov. 15, 2018.

* cited by examiner

SUBSCRIBER SELF-ACTIVATION DEVICE, PROGRAM, AND METHOD

CROSS REFERENCE TO RELATED APPLICATION

This application claims priority to U.S. Provisional Patent Application Ser. No. 62/331,887, filed on May 4, 2016, the disclosure of which is incorporated herein by reference in its entirety.

1. FIELD OF THE INVENTION

The invention relates generally to devices, systems, and methods of providing self-activation by a subscriber for registration of a portable wireless device on a wireless network.

2. BACKGROUND

The market for wireless services is rapidly advancing to becoming a commodity. As a result, competitive pressures are resulting in increased competition that are forcing mobile network operators (carriers) to not only concentrate on subscriber growth, but also on ways to reduce costs. One relatively new method to add subscribers on a low cost basis is through Bring Your Own Device ("BYOD") programs, where the subscriber brings their own device and simply inserts a carrier issued module card such as a SIM (Subscriber Identity Module) card (the SIM may be implemented as a Universal Integrated Circuit Card ("UICC")) into the device. The BYOD program affords the carrier the ability to save money on logistics, capital expenses and risk while opening new low-cost sales distribution channels by simply selling SIM cards.

As the BYOD programs take hold, a self-activation mechanism is desirable to allow a subscriber to activate a wireless subscription without the assistance of the wireless carriers such that subscribers do need not to call customer service care or access a website. The corresponding reduction in overhead further reduces costs to the wireless carrier. In the past, SIM Toolkit ("STK") based applications permitted self-activation of a wireless device on a carrier's particular network using a SMS (Short Message Service) messaging or the like. Such self-activation was feasible on feature phones and previous wireless devices that had limited functionality and typically ran on a lower grade software platform. With newer smartphones having more robust operating systems ("OSs") and advanced application programming interfaces ("APIs"), running the self-activation application from the SIM at the same time the smartphone is initializing during a boot-up sequence may cause the phone to lock up or otherwise freeze the smartphone OS. Thus, there is a need for a solution that permits self-activation of wireless devices via an application on the SIM (or UICC) that does not adversely affect the initialization of the wireless devices, and thus, frustrate the customer experience.

SUMMARY OF THE INVENTION

Prior SIM self-activation applications did not have the ability to regulate the timing of when the self-activation application should run, nor did it have the ability to determine what type of device into which it was inserted. An exemplary embodiment of the invention provides a mechanism by which a subscriber activates the mobile subscription by leveraging an application on the SIM card that replaces traditional enrollment mechanisms typically associated with in-store or online activations with the assistance of the wireless carrier.

According to aspects of the present disclosure, a system for self-activation of a portable device on a wireless network includes a first server configured to store a database comprising information regarding a plurality of portable devices, the information comprises a device type of a portable device corresponding to a unique identifier for each device of the plurality of portable devices. The first server receives a first message from a particular portable device including the unique identifier that indicates the device type of the particular portable device, the device type comprising at least one of a first type of portable device and a second type of portable device; and transmits a second message comprising data including the device type corresponding to the particular portable device. The system also includes a second server configured to receive the second message from the first server and determine when to send an activation message to the portable device based on the device type data of the second message. The second server sends the activation message in response to receiving the second message when the device type determined is the first type of portable device; and the second server sends the activation message after a delay interval in response to receiving the second message when the device type determined is the second type of portable device. The activation message is configured to prompt a user to activate the particular portable device for use on the wireless network, and the delay interval corresponds to a boot-up sequence time of the second type of portable device such that the delay interval is longer than the boot-up sequence time of the second type of portable device.

According to other aspects of the present disclosure, there is a method for self-activation of a portable device on a wireless network comprising a first server storing a database comprising information regarding a plurality of portable devices and a second server configured to send an activation message for activating a wireless device. The method includes receiving a first message at the first server from the portable device including a unique identifier that indicates the device type of the portable device, and determining a device type of the particular portable device corresponding to the unique identifier based on the information stored in the first server for each device of the plurality of portable devices, the information comprising at least one of a first type of portable device and a second type of portable device. The method further includes transmitting a second message comprising data including the device type corresponding to the portable device to the second server; and determining when to send the activation message to the portable device based on the device type data of the second message. The method also includes sending the activation message to the portable device, the sending comprising sending the activation message in response to receiving the second message when the device type determined is the first type of portable device; and sending the activation message after a delay interval in response to receiving the second message when the device type determined is the second type of portable device. The activation message prompts a user to activate the particular portable device for use on the wireless network, and the delay interval corresponds to a boot-up sequence time of the second type of portable device such that the delay interval is longer than the boot-up sequence time of the second type of portable device.

Such embodiments may comprise two SIM Toolkit ("STK") applications (which can be merged as a single application) that: collects the device serial number (e.g., the International Mobile Station Equipment Identity ("IMEI")) and sends the information to a designated back end server; and an application that allows STK based messages to/from the SIM card to another back end server using binary messaging protocols. In addition, the back end server comprises a database containing the makes and models associated with the device used by the subscriber based on the collected serial number; a messaging platform responsible for sending/receiving the binary messages; middleware that processes the STK messages and directs the processed information to various back end systems (e.g., wireless carrier activation & billing system); and middleware that regulates the timing interval dictating when the activation messages should be sent based on the type of device corresponding to the serial number or IMEI.

By regulating the timing interval, execution of the activation application on the SIM may be delayed so that it does not interfere with the initialization of the smartphone. In addition, regulating the timing of the STK-based application of the embodiment allows the provision of follow-up notifications in a case where a self-activation process is not completed by a device subscriber. Alternatively, the device may send a message to begin a self-activation process when initialization of the smartphone OS is completed. In this manner, the problems associated with running the self-activation process during initialization of the smartphone OS can be avoided and carriers may enjoy the cost savings associated with self-activation, which is especially key for the BYOD market.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION

Figure 1:
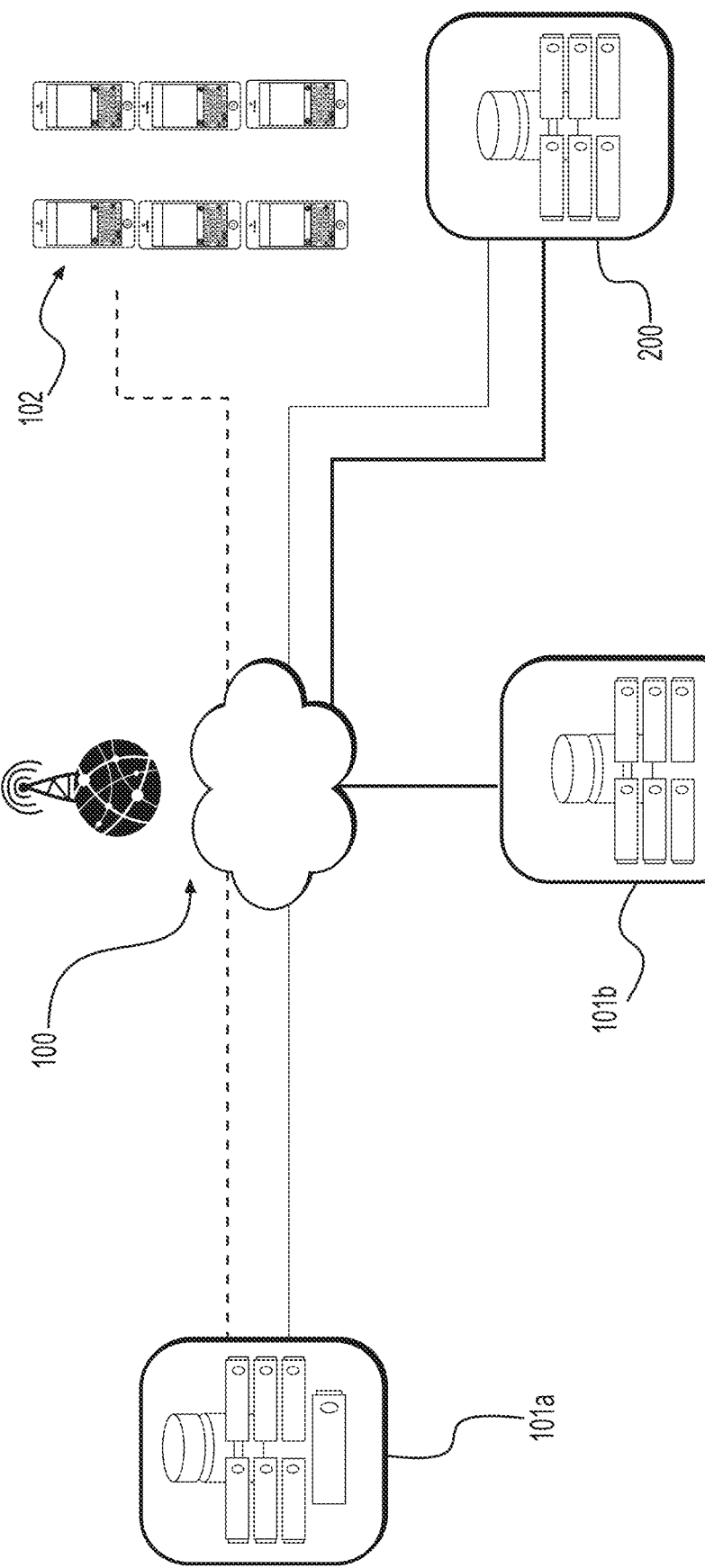
FIG. 1 is a schematic representation of an exemplary environment in which the invention is implemented.
Figure 2:
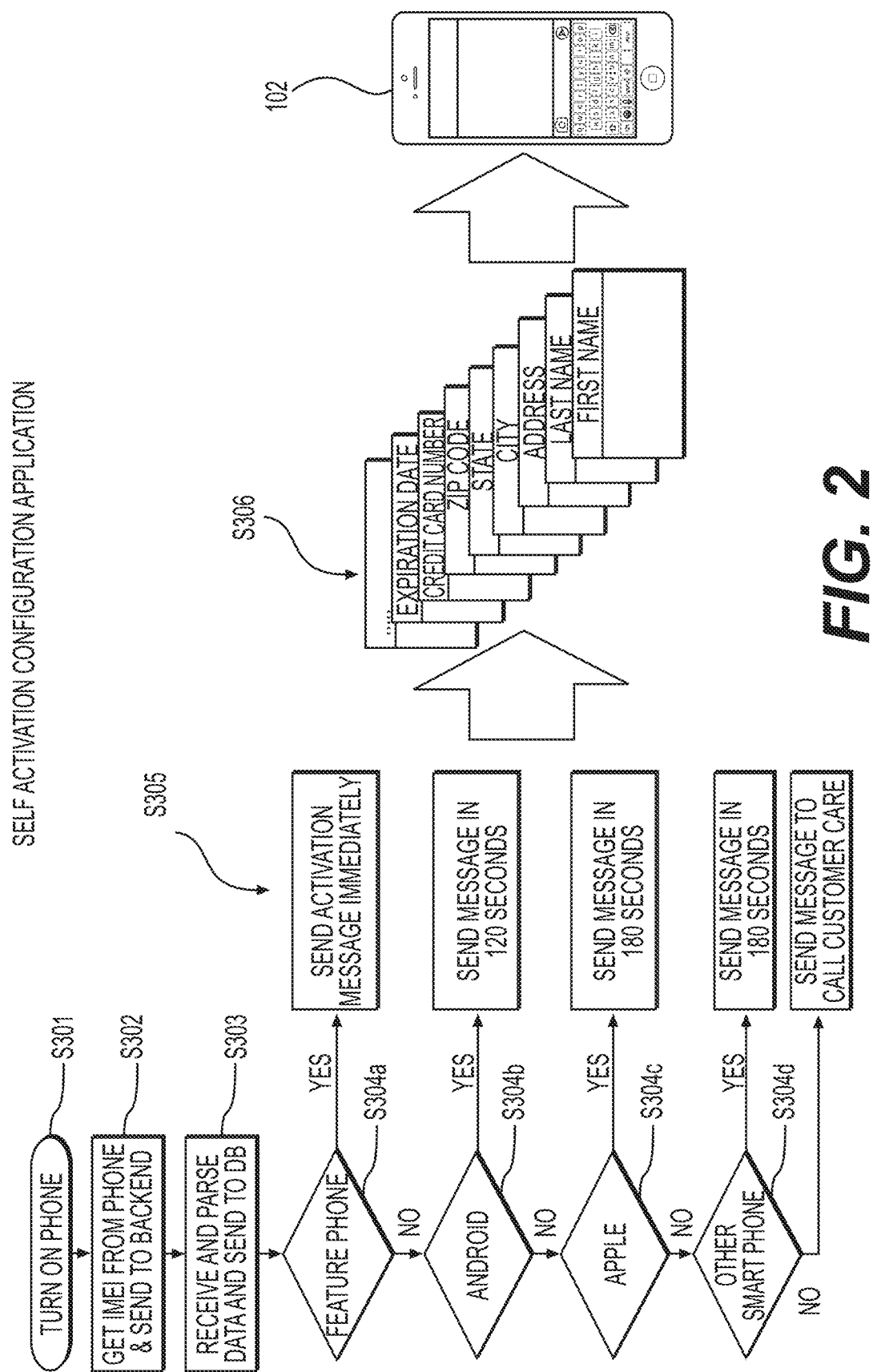
FIG. 2 illustrates a flow chart showing a method for implementing a self-activation process for a wireless device.

Embodiments of the present invention, and their features and advantages, may be understood by referring to FIGS. 1-2.

FIG. 1 shows a system including elements of the wireless network disclosed in U.S. patent application Ser. No. 14/301,858, the disclosure of which is incorporated herein by reference. Referring to FIG. 1, a schematic representation of an exemplary embodiment of the present invention will be described. The environment comprises one or more network(s) 100. Network 100 comprises at least one of a wireless network, a wired network, a local area network (LAN), a wide area network (WAN), an over-the-air (OTA) network, a telecommunication network, and a mobile communication network. One or more servers and other network entities operated by service providers, information providers, users, and other parties is coupled to network 100; and one or more portable wireless devices 102 utilized by service providers, information providers, users (i.e., subscribers), and other parties is also coupled to network 100. Service providers and information providers supply services and information to other parties utilizing network 100 and servers 101, and devices 102 that are coupled to network 100.

The services and information comprise communication services (for example, wired communications services, wireless communications services, electronic communications services), portable device services (for example, mobile device distributing services, mobile device provisioning services), module card services (for example, SIM card distributing services, SIM card provisioning services, SIM card activation services), retention services, positioning services, billing services (for example, everything that is sent to/from a portable device user and/or a portable device service subscriber), security services, customer care services, language services, travel services, software update services, internet gateway services (for example, information on what/how much data is sent to and from the portable device user), Multimedia Messaging Service ("MMS") information and usage, Short Message Service Center ("SMSC") information and usage, and handset repository information (such as IMEI), to name several.

Servers 101 comprise one or more of general purpose computing devices, specialized computing devices, mainframe devices, wired devices, wireless devices, monitoring devices, infrastructure devices, and other devices configured to provide one or more of services and information to service providers, users, and other parties. Devices 102 comprise mobile devices, wired devices, wireless devices, handheld devices, and other portable devices utilized by users. Types of devices 102 may include feature phones (i.e., non-smartphones) or smartphones that run a variety of OSs, including iPhones (running on iOS), Android phones, Windows phones, or any other smartphone OS. Exemplary embodiments provide servers 101 and system 200 that monitor portable devices 102 and collect information from or about portable devices 102. Servers 101 may include server 101a that is a back end server containing information regarding the type of portable device 102, such as a database including IMEI information, that can be used to determine the make, model, and OS of a particular portable device. Servers 101 also may comprise another back end server 101b that includes a wireless carrier activation & billing system in which a record for activation of the device 102 for use in the network 100 by a wireless carrier actually occurs.

Moreover, system 200 is coupled to servers 101a, 101b and devices 102 through network 100. System 200 comprises one or more of a general purpose computing device, a specialized computing device, a mainframe device, a wired device, a wireless device, a monitoring device, an infrastructure device, and any other device configured to collect variable data from one or more data sources (for example, servers, sensors, networks, interfaces, other devices). System 200, amongst other activities, monitors servers 101a, 101b and portable devices 102 for available information from or about portable devices 102 and their use that are coupled to network 100. System 200 may comprise middleware controlling communication between portable devices 102 and servers 101a, 101b. Alternatively, server 101a may be configured to incorporate the functionality of system 200 and manage all of the network communication with devices 102 such that middleware is unnecessary. Another alternative is that server 101a and server 101b may also be combined.

FIG. 2 illustrates a self-activation process according to an embodiment of the invention. At power up during the self-activation stage at S301, SIM of device 102 detects the device's serial number for the first time. Once detected, the SIM of device 102 packages the serial number (e.g., IMEI) into a message at S302 and sends it to the backend mobile device database on server 101*a* to identify the make and model of the device at S303. Upon successful identification of the device, the middleware on system 200 is programmed to determine when the first messages to start a self-activation process are to be sent based on the type of device corresponding to the serial number (304*a*, 304*b*, 304*c*, 304*d*). For example, if the handset database determines that the device is a feature phone (i.e., non-smartphone) S304*a*, then the middleware will send an SMS message S305 immediately to activate the STK on device 102 and begin the self-activation process prompting a user to respond to prompts for activation data S306. Such activation data prompted for at S306 via SMS message may include, for example: First Name, Last Name, Address, City, State, Zip Code, and Payment Information (e.g., Credit Card number and Expiration). Besides SMS, other known messaging services may be suitable for prompting a user for activation data at 306. The message prompts at S306 may be sent by server 101*a* or system 200. Ultimately, data collected from a user of device 102 at S306 is stored at server 102*b* to register device 102 (based on its unique identifier, such as IMEI) for activation on network 100.

When device 102 is determined to be an Android device at S304*b*, the initial activation message prompt may be delayed by two minutes, for example, to permit device 102 complete its boot sequence. In such cases where device 102 is determined to be an iPhone at S304*c*, the initial self-activation message prompts may be timed to be sent three minutes after receipt of the device data S305 to similarly allow the iPhone ample time to complete its boot sequence.

Moreover, if device 102 is determined to be another kind of device or smartphone at 304*d*, the initial activation message can be delayed by an appropriate interval (here 3 minutes) to ensure self-activation does not interfere with the initialization or boot-up sequence of device 102. If the identity of the type of device 102 cannot be determined (S304*d*=No), the STK may display a message to the user of device 102 to call customer service and provide a menu item so that prompts a user to select an item that completes the call via an STK application. The key to the self-activation process is to create a positive and effective user experience, which can only be accomplished by understanding what type of device is being used and setting timing intervals based on particular device types. The intervals for the device types described here are exemplary and may vary depending on the requirements of the OS such that the self-activation process will not interfere with the initialization of device 102.

In addition to the foregoing, the self-activation solution according to the described embodiments has the ability to buffer information at the server level should for some reason the activation process at S306 be interrupted, for example due to bad network coverage or the user inadvertently closing the application. In such cases where the application is interrupted, back end system can use series for "retries" to reinitiate the activation process by sending the remaining messages following some predetermined time interval. An exemplary predetermined time interval could be the time to run the boot-up sequence for a particular OS. The STK can display the message on the screen of device 102 to remind the user to complete the self-activation process.

In the event the subscriber has not completed the self-activation process, system 200 can additionally send an error message to device 102 with an embedded hotline activation number allowing the customer to complete the activation process with a customer care representative over the phone. Such a message would read, for example, "We have experienced an error with an online activation system, would you like to speak to customer care now?" A menu item also appears with the message on the phone screen as "Yes" or "Okay" or similar action and when the menu item is selected then device 102 automatically dials that number using an embedded STK command. If the subscriber does not choose the menu command, the system may retry to reinitiate the activation process as described above. Accordingly, the self-activation process described above maximizes a user's experience while reducing activation costs by limiting direct customer interaction to only when problems occur in the device activation process.

While the invention has been described in connection with various example structures, configurations, and illustrative implementations, it will be understood by those skilled in the art that other variations and modifications of the structures, configurations, and implementations described above may be made without departing from the scope of the invention. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other implementations comprising other possible combinations. For example, the invention applies to any data carrier that includes subscriber information necessary for activation of a device on a wireless network and not just the SIM and UICC described herein. Other structures, configurations, and implementations consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A system for self-activation of a portable device on a wireless network, the system comprising:
    a first server configured to:
        store a database comprising information regarding a plurality of portable devices, the information comprises a device type of a portable device corresponding to a unique identifier for each device of the plurality of portable devices;
        receive a first message from a particular portable device including the unique identifier that indicates the device type of the particular portable device, the device type comprising at least one of a first type of portable device and a second type of portable device; and
        transmit a second message comprising data including the device type corresponding to the particular portable device; and
    a second server configured to:
        receive the second message;
        determine when to send an activation message to the particular portable device based on the device type data of the second message; and
        send the activation message to the particular portable device for activating the particular portable device, comprising:
            sending the activation message in response to receiving the second message when the device type of the particular portable device determined is the first type of portable device; and sending the activation message after a delay interval in response to receiving the second message when the device type of the particular portable device determined is the second type of portable device, wherein the activation message is configured to prompt a user of the particular portable device to activate the particular portable device for use on the wireless network, and wherein the delay interval corresponds to a boot-up sequence time of the second type of portable device such that the delay interval is longer than the boot-up sequence time of the second type of portable device.

2. The system of claim 1, wherein the first server and the second server are combined as a single activation server.

3. The system of claim 1, further comprising middleware configured to control communication between the particular portable device and each of the first server and the second server.

4. The system of claim 3, wherein the middleware is resident on the first system.

5. The system of claim 1, wherein the first type of portable device is a feature phone.

6. The system of claim 5, wherein the second type of portable device is a smartphone running an operating system, the operating system is one of iOS, Android, or Windows.

7. The system of claim 1, wherein each of the first message, the second message, and the activation message are in SMS format.

8. The system of claim 1, the second server configured is configured to send the activation message in response to receiving the second message when the device type of the particular portable device determined is a third type of portable device; and wherein when the device type of the particular portable device determined is the third type of portable device, the activation message is configured to prompt a user of the particular portable device to contact a provider of the wireless network.

9. The system of claim 1, wherein the second server is configured to resend the activation message when the user fails to activate the particular portable device for use on the wireless network within a predetermined period of time that is longer than the delay interval.

10. A method for self-activation of a portable device on a wireless network comprising a first server storing a database comprising information regarding a plurality of portable devices and a second server configured to send an activation message for activating a particular portable device, the method comprising:

receiving a first message at the first server from the particular portable device including a unique identifier that indicates a device type of the particular portable device;

determining the device type of the particular portable device corresponding to the unique identifier based on the information stored in the first server for each device of the plurality of portable devices, the information comprising at least one of a first type of portable device and a second type of portable device;

transmitting a second message comprising data including the device type of the particular portable device corresponding to the portable device to the second server;

determining when to send the activation message to the particular portable device based on the device type data of the second message; and sending the activation message to the particular portable device, the sending comprising:

sending the activation message in response to receiving the second message when the device type of the particular portable device determined is the first type of portable device; and sending the activation message after a delay interval in response to receiving the second message when the device type determined of the particular portable device is the second type of portable device, wherein the activation message prompts a user of the of the particular portable device to activate the particular portable device for use on the wireless network, and wherein the delay interval corresponds to a boot-up sequence time of the second type of portable device such that the delay interval is longer than the boot-up sequence time of the second type of portable device.

11. The method of claim 10, wherein the first server and the second server are combined as a single activation server.

12. The method of claim 10, wherein the first type of portable device is a feature phone.

13. The method of claim 12, wherein the second type of portable device is a smartphone running an operating system, the operating system is one of iOS, Android, or Windows.

14. The method of claim 10, wherein each of the first message, the second message, and the activation message are in SMS format.

15. The method of claim 10, wherein the sending the activation message to the particular portable device further comprises sending the activation message in response to receiving the second message when the device type of the particular portable device determined is a third type of portable device; and wherein when the device type determined is the third type of portable device, the activation message prompts a user of the particular portable device to contact a provider of the wireless network.

16. The method of claim 10, further comprising resending the activation message when the user fails to activate the particular portable device for use on the wireless network within a predetermined period of time that is longer than the delay interval.

* * * * *